United States Patent
Hsieh et al.

(10) Patent No.: US 10,890,718 B2
(45) Date of Patent: Jan. 12, 2021

(54) SILICON PHOTONIC INTEGRATED SYSTEM IN A SWITCH

(71) Applicant: Centera Photonics Inc., Hsinchu (TW)

(72) Inventors: Chien-Chen Hsieh, Hsinchu (TW); Shang-Jen Yu, Hsinchu County (TW); Hsiao-Chin Lan, New Taipei (TW)

(73) Assignee: Centera Photonics Inc., Hsinchu (TW)

( * ) Notice: Subject to any disclaimer, the term of this patent is extended or adjusted under 35 U.S.C. 154(b) by 0 days.

(21) Appl. No.: 16/565,434

(22) Filed: Sep. 9, 2019

(65) Prior Publication Data

US 2020/0158957 A1    May 21, 2020

(30) Foreign Application Priority Data

Nov. 21, 2018 (TW) ............... 107141549 A

(51) Int. Cl.
| | | |
|---|---|---|
| *G02B 6/293* | (2006.01) | |
| *H04B 10/50* | (2013.01) | |
| *H04J 14/02* | (2006.01) | |
| *H04Q 11/00* | (2006.01) | |
| *G02B 6/12* | (2006.01) | |
| *G02B 6/35* | (2006.01) | |

(52) U.S. Cl.
CPC ....... *G02B 6/2938* (2013.01); *G02B 6/12016* (2013.01); *G02B 6/12019* (2013.01); *G02B 6/35* (2013.01); *H04B 10/506* (2013.01); *H04J 14/02* (2013.01); *H04Q 11/0001* (2013.01); *G02B 2006/12061* (2013.01); *G02B 2006/12145* (2013.01); *G02B 2006/12164* (2013.01)

(58) Field of Classification Search
None
See application file for complete search history.

(56) References Cited

U.S. PATENT DOCUMENTS

| | | | | |
|---|---|---|---|---|
| 5,684,611 A | * | 11/1997 | Rakuljic | G02B 5/1857 359/10 |
| 6,055,250 A | * | 4/2000 | Doerr | H01S 5/026 372/23 |
| 6,256,431 B1 | * | 7/2001 | Mesh | G02B 6/12021 385/15 |
| 7,130,499 B2 | * | 10/2006 | Grubb | G02B 6/12004 385/14 |

(Continued)

FOREIGN PATENT DOCUMENTS

| | | |
|---|---|---|
| TW | I451143 | 9/2014 |
| TW | I600288 | 9/2017 |
| WO | 2016206031 | 12/2016 |

*Primary Examiner* — Tina M Wong
(74) *Attorney, Agent, or Firm* — JCIPRNET

(57) ABSTRACT

A silicon photonic integrated system in a switch includes a multi-wavelength laser module, a first multiplexer, an optical channel, and a light signal generating element. The multi-wavelength laser module is configured to emit n laser beams with different peak wavelengths, and n is an integer greater than 2. The first multiplexer is optically coupled to the multi-wavelength laser module and configured to receive the laser beams and combine them into a combined beam. The optical channel is configured to receive a combined beam. The light signal generating element receives the combined beam through the optical channel and modulates the combined beam to emit a plurality of light output signals.

11 Claims, 6 Drawing Sheets

(56) References Cited

U.S. PATENT DOCUMENTS

| | | | |
|---|---|---|---|
| 7,248,617 B2* | 7/2007 | Volodin | G02B 27/0944 372/102 |
| 7,949,030 B2* | 5/2011 | Volodin | H01S 5/065 372/50.123 |
| 8,861,978 B2 | 10/2014 | Meade et al. | |
| 9,025,958 B1 | 5/2015 | Ketelsen et al. | |
| 10,567,085 B2* | 2/2020 | Luo | H01S 5/0656 |
| 2002/0196492 A1* | 12/2002 | Trisnadi | H04B 10/25073 398/79 |
| 2003/0228091 A1* | 12/2003 | Lee | G02B 6/12019 385/18 |
| 2004/0208428 A1* | 10/2004 | Kikuchi | G02B 6/2938 385/24 |
| 2004/0264963 A1* | 12/2004 | Kani | H04J 14/0246 398/72 |
| 2005/0053324 A1* | 3/2005 | Ridgway | H04B 10/272 385/23 |
| 2005/0089273 A1* | 4/2005 | Squires | G02B 6/12019 385/37 |
| 2006/0210271 A1* | 9/2006 | Mori | H04J 14/0282 398/71 |
| 2007/0133990 A1* | 6/2007 | Kim | G02B 6/12004 398/72 |
| 2010/0290790 A1* | 11/2010 | Murthy | H04B 10/506 398/192 |
| 2011/0293279 A1* | 12/2011 | Lam | H04J 14/02 398/79 |
| 2012/0251116 A1* | 10/2012 | Li | H04B 10/40 398/79 |
| 2013/0170833 A1* | 7/2013 | Nagarajan | G02B 6/12026 398/48 |
| 2016/0327741 A1* | 11/2016 | Wu | G02B 6/125 |
| 2017/0359126 A1* | 12/2017 | Ho | H04J 14/0256 |
| 2018/0348456 A1* | 12/2018 | Ho | G02B 6/4256 |
| 2019/0007157 A1* | 1/2019 | Anderson | H04J 14/02 |
| 2019/0025518 A1* | 1/2019 | Ji | G02B 6/12 |
| 2020/0158957 A1* | 5/2020 | Hsieh | G02B 6/35 |
| 2020/0162184 A1* | 5/2020 | Barbarossa | H04J 14/0209 |
| 2020/0280372 A1* | 9/2020 | Li | H04B 10/54 |

* cited by examiner

SILICON PHOTONIC INTEGRATED SYSTEM IN A SWITCH

CROSS-REFERENCE TO RELATED APPLICATION

This application claims the priority benefit of Taiwan application serial no. 107141549, filed on Nov. 21, 2018. The entirety of the above-mentioned patent application is hereby incorporated by reference herein and made a part of this specification.

BACKGROUND

Technical Field

The disclosure relates to a silicon photonic integrated system in a switch.

Description of Related Art

With the development of various applications such as communication software, high-definition video and audio, online streaming, and so on, the amount of data generated by each person grows exponentially. Therefore, data centers have been widely built in surrounding environments. As consumer demands for bandwidth and data processing speed increase, switch interfaces, the key component of the data centers, also increase rapidly. More and more interfaces increase the complexity of internal wiring of the switch, which greatly increases the costs of subsequent assembly and related maintenance.

SUMMARY

The disclosure provides a silicon photonic integrated system in a switch, wherein the number of optical channels is fewer, and the arrangement of internal wiring is relatively simple.

According to an embodiment of the disclosure, a silicon photonic integrated system in a switch includes a multi-wavelength laser module, a first multiplexer, an optical channel, and a light signal generating element. The multi-wavelength laser module provides the continuous wave and is configured to emit n laser beams with different peak wavelengths, and n is an integer greater than 2. The first multiplexer is optically coupled to the multi-wavelength laser module, and configured to receive the laser beams and combine the laser beams into a combined beam. The optical channel is configured to receive the combined beam. The light signal generating element receives the combined beam through the optical channel and modulates the combined beam to emit a plurality of light output signals.

In an embodiment of the disclosure, the light signal generating element further includes a beam splitter and m light modulators, wherein n is an integer greater than m. The beam splitter is optically coupled to the optical channel and the light modulator, respectively, and the beam splitter receives the combined beam through the optical channel, splits the combined beam into a plurality of first beams, and respectively transmits the first beams to the m light modulators. Each of the first beams includes n laser beams with different peak wavelengths. The m light modulators respectively modulate the first beams to respectively emit the light output signals.

In an embodiment of the disclosure, the number of the light output signals corresponds to the number of the light modulators.

In an embodiment of the disclosure, each of the m light modulators further includes a demultiplexer (DEMUX), a plurality of light modulating elements, and a second multiplexer. The DEMUX is optically coupled to the beam splitter and the plurality of light modulating elements, respectively, and is configured to receive a corresponding first beam, split the corresponding first beams into a plurality of second beams, and respectively transmit the second beams to the light modulating elements. After the light modulating elements modulate the corresponding second beams, the light modulating elements respectively generate a corresponding first-order light signal, and the first-order light signals are transmitted to the second multiplexer. The second multiplexer receives and combines the first-order light signals from the plurality of light modulating elements to output a corresponding light output signal.

In an embodiment of the disclosure, the number of the light modulating elements corresponds to n.

In an embodiment of the disclosure, the silicon photonic integrated system in the switch further includes a controller configured to drive the light modulating elements in the light modulators.

In an embodiment of the disclosure, the m light modulators are respectively integrated into different package modules.

In an embodiment of the disclosure, the first multiplexer, the optical channel, and the beam splitter are integrated into a package module.

In an embodiment of the disclosure, the first multiplexer, the optical channel, and the light signal generating element are integrated into a package module.

In an embodiment of the disclosure, the multi-wavelength laser module further includes a plurality of laser beam emitting modules respectively emitting one of the n laser beams.

In an embodiment of the disclosure, the optical channel has a first end and a second end opposite to each other. The first end is connected to the first multiplexer, and the second end is connected to the light signal generating element.

In view of the above, in the silicon photonic integrated system in the switch as provided in one or more embodiments herein, the multiplexer (e.g., the first multiplexer) is disposed between the multi-wavelength laser module and the light signal generating element, and the multiplexer combines the laser beams coming from the multi-wavelength laser module to one combined beam. The combined beam enters the light signal generating element through one optical channel. Hence, the arrangement in the silicon photonic integrated system in the switch as provided in one or more embodiments herein contributes to effective reduction of the number of optical channels at the upstream of a light path of the light signal generating elements.

To make the above features and advantages provided in one or more of the embodiments more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1A:
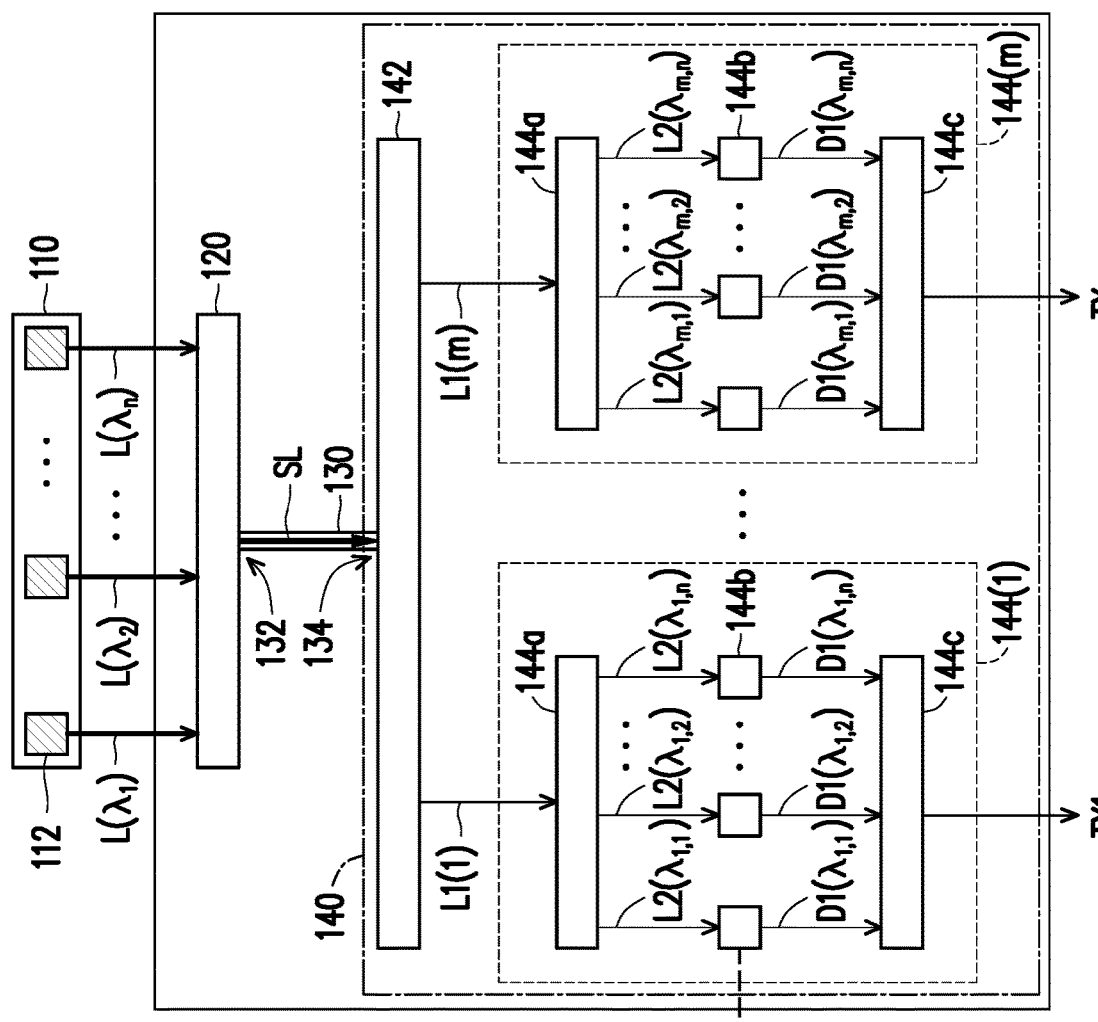
FIG. 1A is a schematic view of a silicon photonic integrated system in a switch according to an embodiment of the disclosure.

FIG. 1A is a schematic view of a silicon photonic integrated system in a switch according to an embodiment of the disclosure. FIG. 1B is a schematic view of bonding the silicon photonic integrated system in the switch depicted in FIG. 1A to an external substrate.

With reference to FIG. 1A, in the present embodiment, a silicon photonic integrated system 100 in a switch includes a multi-wavelength laser module 110, a first multiplexer (MUX) 120, an optical channel 130, a light signal generating element 140, and a controller 150, and the optical channel 130 may be optical fiber, a waveguide, or any element capable of transmitting light signals. The aforesaid elements, the configuration relationships of the elements, and the way to transmit the light will be elaborated in the following paragraphs.

The multi-wavelength laser module 110 is configured to emit n laser beams L with different peak wavelengths, wherein the laser beams are continuous waves and peak wavelength $\lambda$ ($\lambda_1$, $\lambda_2$, and $\lambda_n$) refers to the wavelength corresponding to the maximum light intensity of the laser beams L. Particularly, the multi-wavelength laser module 110 includes a plurality of laser beam emitting modules 112. The laser beam emitting modules 112 are arranged in an array, for instance, and respectively emit the corresponding laser beam L. In the present embodiment, the laser beam emitting modules 112 are, for instance, laser diode (LD) chips, which should however not be construed as a limitation in the disclosure. Besides, n is an integer greater than 2.

The first MUX 120 is disposed between the multi-wavelength laser module 110 and the optical channel 130, and the first MUX 120 is optically coupled to the multi-wavelength laser module 110 and the optical channel 130. In the embodiments of the disclosure, the so-called "two optically coupled elements A and B" means that the beam transmitted in the element A can enter the element B, and vice versa. In the present embodiment, the first MUX 120 may also be optically coupled to the multi-wavelength laser module 110 through a plurality of optical coupling elements (e.g., lenses, not shown).

The first MUX 120 may include an arrayed waveguide grating (AWG, not shown) having a plurality of input waveguides located at the light incident end, an output waveguide (not shown) located at the light exit end, and a plurality of waveguide elements (not shown) of different lengths between the light incident end and the light exit end. In the present embodiment, the n laser beams L enter the first MUX 120 through the input waveguides, combined into a combined beam SL through the waveguide elements of different lengths and the output waveguide, and then outputted to the optical channel 130.

The optical channel 130 has two opposite ends, a light incident end 132 and a light exit end 134. The light incident end 132 is optically coupled to the first MUX 120, and the light exit end 134 is optically coupled to the beam splitter 142 of the light signal generating element 140. The combined beam SL may enter the optical channel 130 from the light incident end 132, leave the optical channel 130 from the light exit end 134, and enter the light signal generating element 140 located at a back end of the optical channel 130.

The light signal generating element 140 receives and modulates the combined beam SL to generate a plurality of light output signals $TX_1$-$TX_m$. In detail, the light signal generating element 140 includes a beam splitter 142 and m light modulators 144. The aforesaid elements, the configuration relationships of the elements, and how the light signal generating element 140 modulates the combined beam SL will be elaborated in the following paragraphs.

The beam splitter 142 generally refers to an optical element capable of splitting a beam into plural beams. The beam splitter 142 is optically coupled to the optical channel 130 and the m light modulators 144, respectively. In the present embodiment, the beam splitter 142 may include a planar light wave circuit (PLC) having an inside structure of Y-branch waveguide. The beam splitter 142 receives the combined beam SL through the optical channel 130. When the combined beam SL enters the beam splitter 142 and passes through the Y-branch waveguide, the combined beam SL is split into a plurality of first beams L1(1)-L1(m), and the beam splitter 142 transmits the first beams L1(1)-L1(m) respectively to the light modulators 144(1)-144(m). Each of the first beams L1(1)-L1(m) includes a portion of the laser beams L with n different peak wavelengths $\lambda$. Besides, the number of the first beams L1(1)-L1(m) is m, for instance, wherein m is an integer greater than 1 and greater than n. For instance, the laser beam emitting modules 112 can emit laser beams L($\lambda$1)-L($\lambda$4) with four different peak wavelengths (i.e., n=4), and the laser beams L($\lambda$1)-L($\lambda$4) are split by the beam splitter 142 into 128 first beams L1(1)-L1(128) (i.e., m=128). As such, each of the first beams includes the laser beams with the aforesaid four different peak wavelengths; however, for the beam is split, if there is no other intensity gain added, the intensity of the four laser beams in each first beam L1 is less than that of the laser beams L emitted by the laser light emitting module 112. Note that "n=4" and "m=128" explicitly mentioned above are for explanatory purposes and should not be construed as limitations in the disclosure.

Each light modulator 144 further includes a demultiplexer (DEMUX) 144a, a plurality of light modulating elements 144b, and a second MUX 144c. A first-channel light modulator 144(1) will be taken as an example to elaborate the elements and the configuration relationship of the elements in the following paragraphs, wherein 144(m) represents an $m^{th}$-channel light modulator.

In the present embodiment, the DEMUX 144a includes an AWG (not shown). The structure of the DEMUX 144a is similar to the structure of the MUX 120, but the light transmission directions of the DEMUX 144a and the MUX 120 are reversed. Specifically, the DEMUX 144a has an input waveguide located at the light incident end, a plurality of output waveguides located at the light exit end, and a plurality of waveguide elements between the light incident end and the light exit end. When the first beam L1 enters the DEMUX 144a, the DEMUX 144a splits the corresponding first beam L1 into a plurality of second beams L2 having n different peak wavelengths $\lambda$ (i.e., $\lambda_1$-$\lambda_n$). The second beams L2 and the laser beams L all include n laser beams with different but corresponding peak wavelengths. The corresponding relationship provided herein may refer to a oneto-one relationship, a many-to-one relationship, or a one-to-many relationship. Here, L2 ($\lambda_{1,1}$) represents the laser beam having the first peak wavelength $\lambda_1$ and included in the second beam L2 of the first-channel light modulator 144(1), L2($\lambda_{1,n}$) represents the laser beam having the $n^{th}$ peak wavelength λn and included in the second beam L2 of the first-channel light modulator 144(1), L2($\lambda_{m,n}$) represents the laser beam having the $n^{th}$ peak wavelength $\lambda_n$ and included in the $m^{th}$-channel second beam L2, and others can be derived from the above and thus will not be further explained.

The light modulating elements 144b are generally configured to modulate beams (e.g., continuous-wave laser beams) to be light signals. The number of the light modulating elements 144b corresponds to n. In the present embodiment, the n light modulating elements 144b in the first-channel light modulator 144(1) respectively receive the second beams L2($\lambda_{1,1}$)-L2($\lambda_{1,n}$) having the first peak wavelength to the $n^{th}$ peak wavelength, respectively convert the second beams L2($\lambda_{1,1}$)-L2($\lambda_{1,n}$) into corresponding first-order light signals D1($\lambda_{1,1}$)-D1($\lambda_{1,n}$), and respectively transmit the n first-order light signals D1 to the second MUX 144c. The controller 150 can control the light modulating elements 144b and may be a central processing unit (CPU) in the switch or may be a driving circuit receiving commands from the CPU to drive the light modulating elements 144b.

In the present embodiment, the light modulating elements 144b is modulated by controlling voltages to change the refraction index or the absorption coefficient of the optical channel or the light waveguide where the second beams L2 pass, so that in the optical channel or the light waveguide, the second beams L2 will have opposite effects, such as bright/dark, passed/unpassed, phase changes, and thus a second beam L2 with the continuous-wave nature can be converted into the first-order light signal D1 with the properties of a pulse wave in form of a digital signal. In another embodiment of the disclosure, each light modulating element 144b may also be a Mach-Zehnder modulator having two light waveguides. One of the two light waveguides is equipped with a bias element, while the other is not. After entering the light modulating elements 144b, the second beams L2 are respectively directed to the two light waveguides; two beams output by the two light waveguides can be controlled to learn whether phase change occurs through controlling the bias element of one of the light waveguides, and the bright-dark relationship can then be built through constructive or destructive interferences. As such, digital signals can be generated. In brief, according to an embodiment of the disclosure, the m channel light modulators 144(1)-144(m) receive the electrical signals from the controller 150, and n light modulating elements 144b in each channel light modulator carry out light modulation thus to convert the electrical signals into the first-order light signals D1.

The second MUX 144c receives the plurality of first-order light signals D1($\lambda_{1,1}$)-D1($\lambda_{1,n}$) and combines them into a corresponding light output signal $TX_1$. The structure and the effects of the second MUX 144c are similar to those of the first MUX 120 and thus will not be further described below. The number of the light output signals $TX_1$-$TX_m$ corresponds to the number of the m light modulators 144(1)-144(m).

Other channel light modulators 144(2~m) also output the light output signals $TX_2$-$TX_m$ in a similar manner, and thus no explanation is further provided below.

Note that the specific embodiments of the first MUX 120, the second MUX 144c, the beam splitter 142, and the light modulating elements 144b are provided to better explain the effects achieved herein. In other embodiments, other equivalent elements can be applied as replacements, and the aforesaid elements should not be construed as limitations in the disclosure.

Next, with reference to FIG. 1B, the silicon photonic integrated system in the switch 100 as provided in the present embodiment may be connected to an external substrate OS through a plurality of conductive members C, and the conductive members C may be conductive bumps, which should however not be construed as a limitation in the disclosure. For instance, the conductive members C may be conductive wires capable of electrically connecting the silicon photonic integrated system 100 to the external substrate OS. The external substrate OS is, for instance, a circuit board, e.g., a printed circuit board (PCB), which should however not be construed as a limitation in the disclosure. Besides, with reference to FIG. 1A, the first MUX 120, the optical channel 130, and the light signal generating element 140 in the silicon photonic integrated system in the switch 100 as provided in the present embodiment can be integrated as a light active chip OD. The light active chip OD is mainly configured to perform the optical functions of the silicon photonic integrated system in the switch 100. The controller 150 configured to provide the electrical signals can be integrated as an electrical active chip ED. Said two chips OD and ED are, for instance, silicon chips and can be inserted to the external substrate OS through performing a chip scale package (CSP) process.

In light of the foregoing, in the silicon photonic integrated system in the switch 100 according to the present embodiment, the MUX 120 is disposed between the multi-wavelength laser module 110 and the light signal generating element 140, and the MUX 120 combines the laser beams L from the multi-wavelength laser module 110 into one combined beam SL and guides the combined beam SL to one optical channel 130. Hence, the silicon photonic integrated system in the switch 100 as provided herein contributes to reducing the number of optical channels at the upstream of a light path of the light signal generating elements 140.

Next, in the light signal generating element 140, the beam splitter 142 splits the combined beam SL into a plurality of first beams L1. The beam splitter 142 guides the first beams L1 to m light modulators 144(1)-144(m) at different locations, so as to respectively modulate the first beams L1. Therefore, the internal transmission wires in each light modulator 144 are merely required to be arranged in the area occupied by the corresponding light modulator 144 and are unlikely extended elsewhere. As such, the arrangement of the silicon photonic integrated system in the switch 100 as provided herein can effectively simplify the internal wiring in the light signal generating element 140.

Note that some descriptions provided in the following embodiments are derived from those provided in the previous embodiments, and the descriptions of the same technical content are omitted. Explanations of the same elements given in the previous embodiment may also apply in the following embodiments and will not be further provided.

FIG. 2 to FIG. 5 are schematic views of the silicon photonic integrated system in the switch according to different embodiments.

Figure 1A:
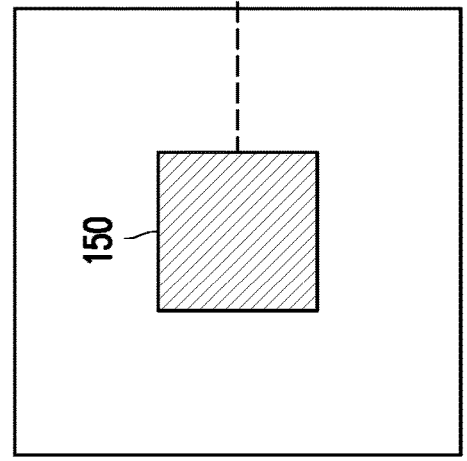
Figure 1B:
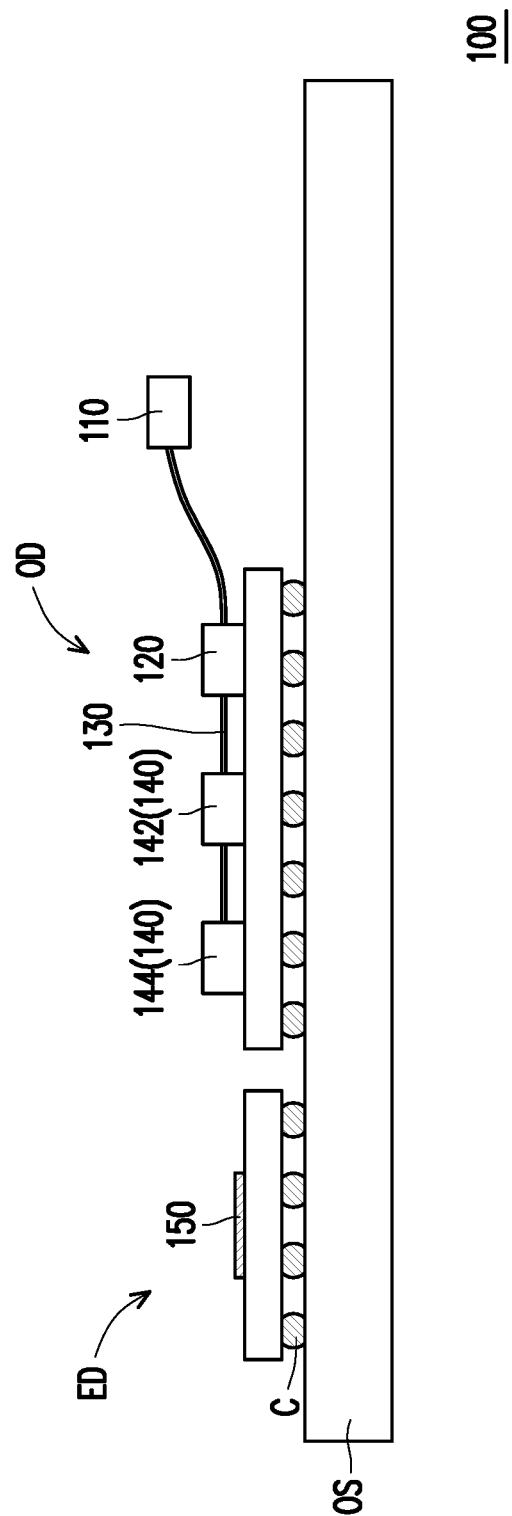
FIG. 1B is a schematic view of bonding the silicon photonic integrated system in the switch depicted in FIG. 1A to an external substrate.
Figure 2:
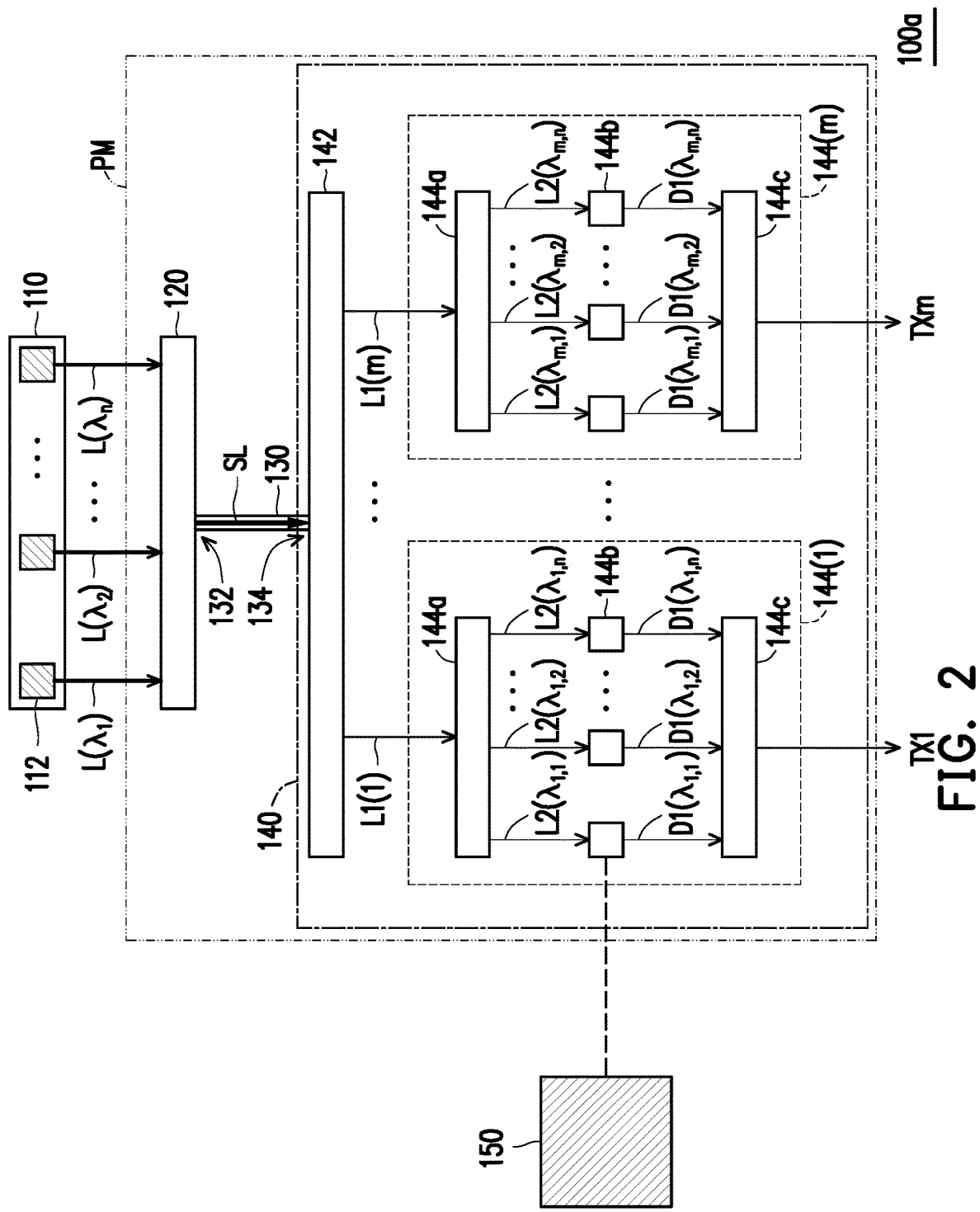
FIG. 2 to FIG. 5 are schematic views of the silicon photonic integrated system in the switch according to different embodiments.

With reference to FIG. 2, the silicon photonic integrated system in the switch 100a as provided herein is similar to the silicon photonic integrated system in the switch 100 in FIG. 1, and the difference lies in that the first MUX 120, the optical channel 130, and the light signal generating element 140 in the silicon photonic integrated system in the switch 100a are integrated into the same package module PM. The elements or modules can be packaged into one package in a system in package (SIP) manner, or be commonly packaged onto a silicon wafer through a wafer level package process and then inserted onto the external substrate OS. In another embodiment, the first MUX 120, the optical channel 130, and the light signal generating element 140 may also be formed in one chip in a system on chip (SoC) manner, packaged into single package.

Figure 3:
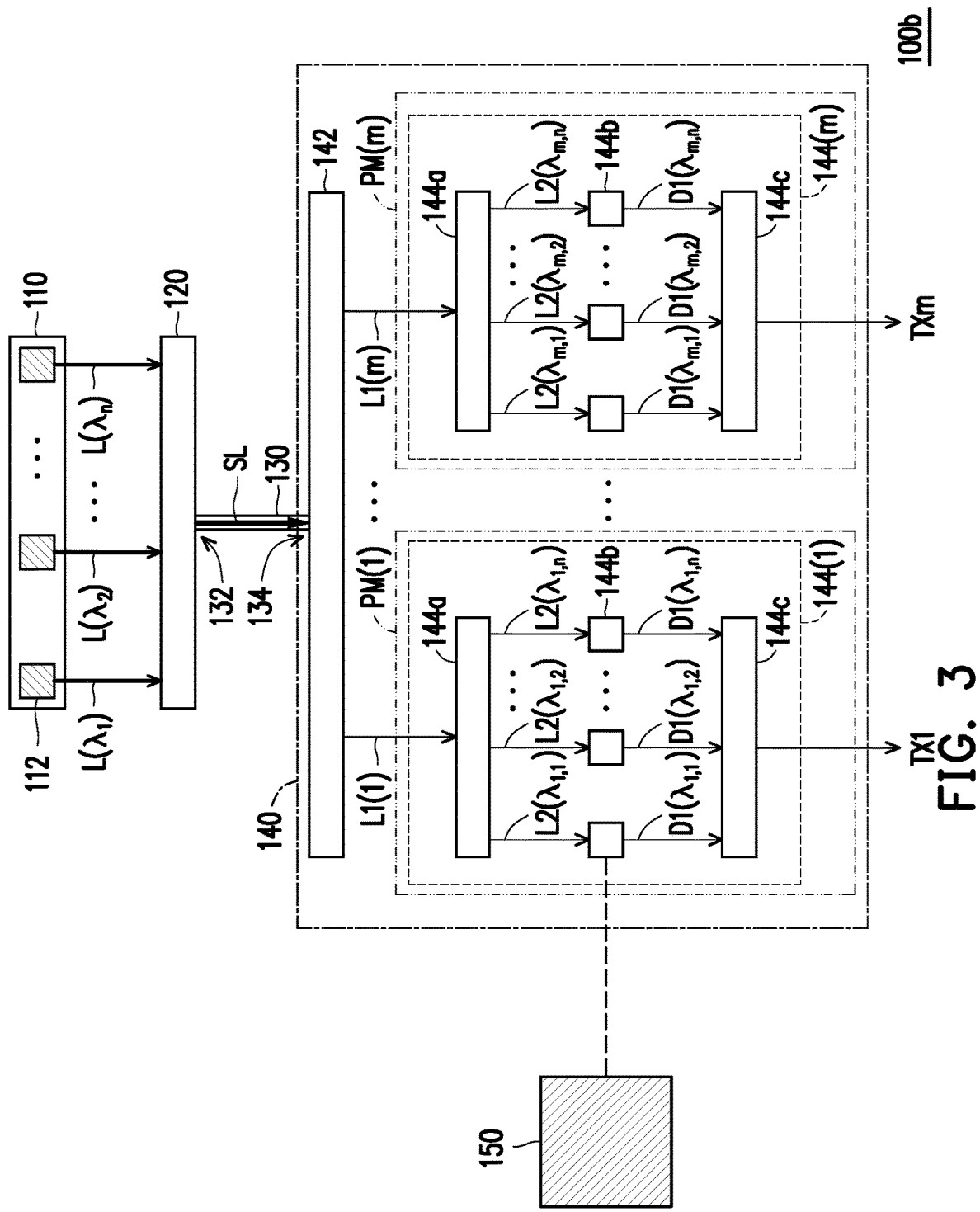

With reference to FIG. 3, the silicon photonic integrated system in the switch 100b as provided herein is similar to the silicon photonic integrated system in the switch 100 in FIG. 1, and the difference lies in that the first- to $m^{th}$-channel light modulators 144(1)-144(m) are respectively integrated into different package modules PM(1)-PM(m).

Figure 4:
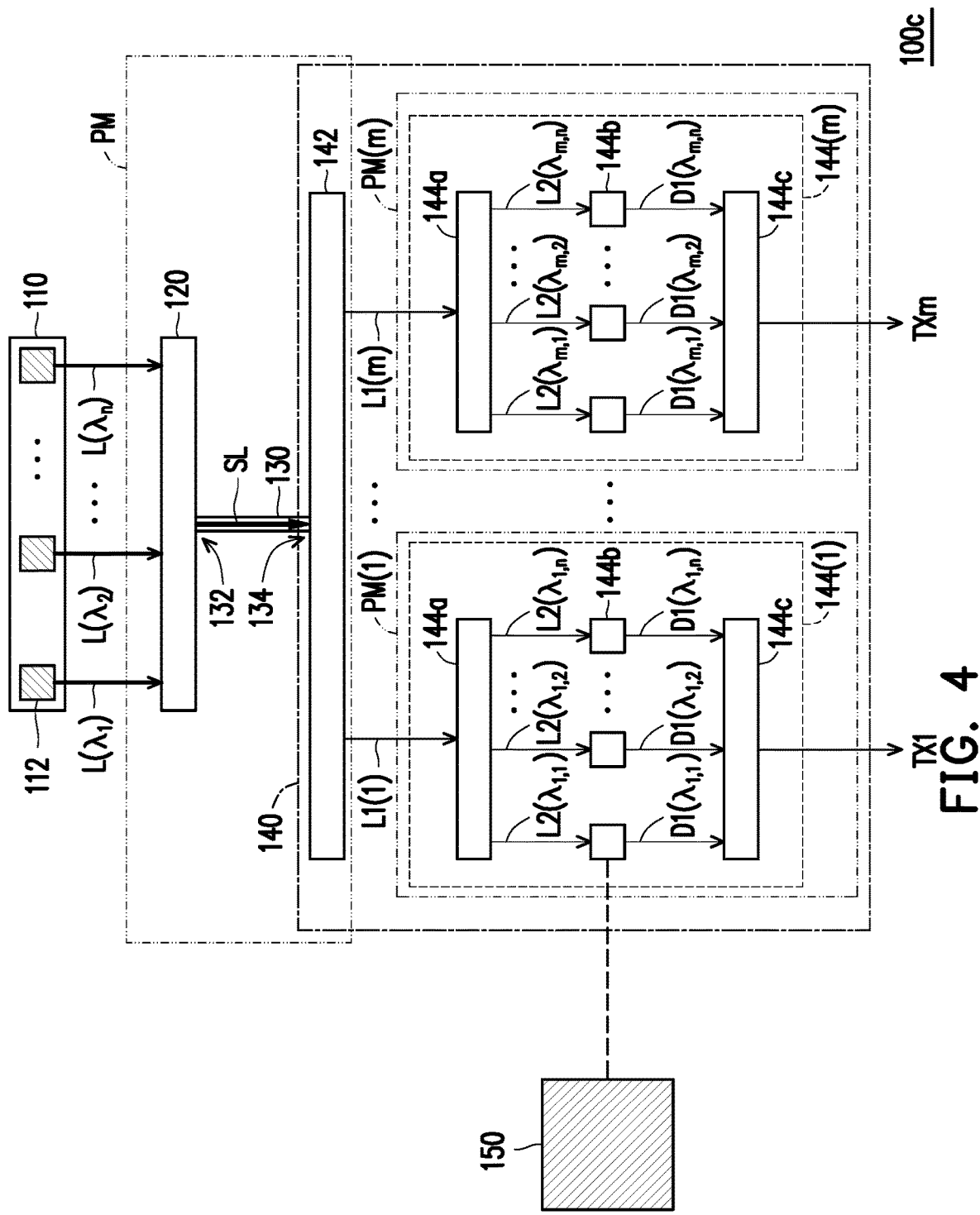

With reference to FIG. 4, the silicon photonic integrated system in the switch 100c as provided herein is similar to the silicon photonic integrated system in the switch 100 in FIG. 1, and the difference lies in that the first MUX 120, the optical channel 130, and the beam splitter 142 are integrated into one package module PM.

Figure 5:
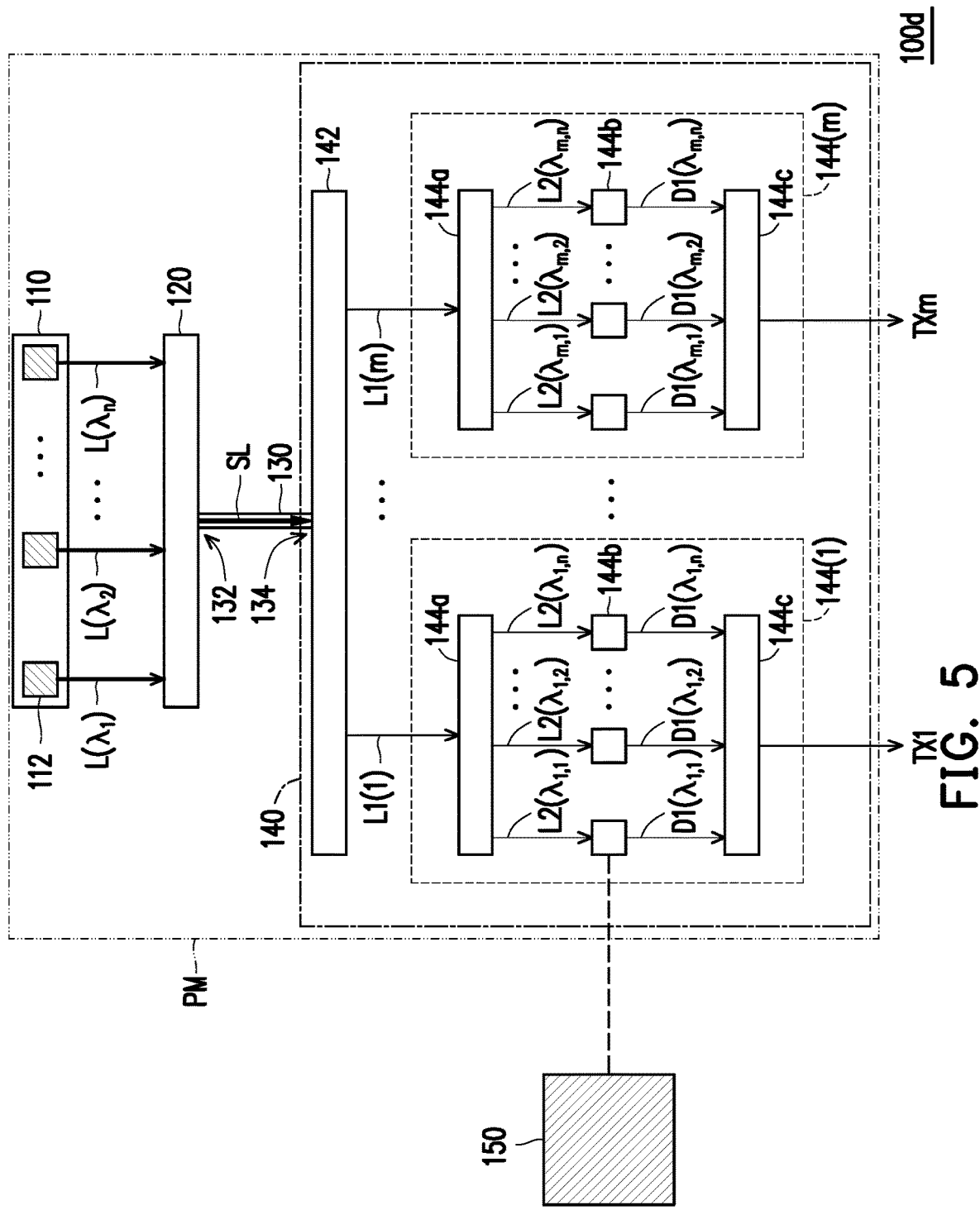

With reference to FIG. 5, the silicon photonic integrated system in the switch 100d as provided herein is similar to the silicon photonic integrated system in the switch 100 in FIG. 1, and the difference lies in that the multi-wavelength laser module 110, the first MUX 120, the optical channel 130, and the light signal generating element 140 are integrated into one package module PM.

To sum up, in the silicon photonic integrated system in the switch as provided in one or more embodiments herein, the first multiplexer is disposed between the multi-wavelength laser module and the light signal generating element, and the first multiplexer combines the laser beams coming from the multi-wavelength laser module to one combined beam. The combined beam enters the light signal generating element through one optical channel. Hence, the arrangement in the silicon photonic integrated system in the switch as provided in one or more embodiments herein contributes to effective reduction of the number of optical channels.

Additionally, in the light signal generating element, the beam splitter is applied to split the combined beam into the first beams, and the first beams are guided to different channel light modulators. Accordingly, in the areas occupied by the channel light modulators, the channel light modulators are able to respectively modulate the corresponding first beams. This design can effectively lower the complexity of the internal wiring of the silicon photonic integrated system in the switch.

Although exemplary embodiments of the disclosure have been described in detail above, the disclosure is not limited to specific embodiments, and various modifications and changes may be made within the scope of the disclosure defined in the claims.

What is claimed is:
1. A silicon photonic integrated system in a switch, comprising:
a multi-wavelength laser module, configured to emit n laser beams with different peak wavelengths, wherein n is an integer greater than 2 and laser beams are continuous waves;
a first multiplexer, optically coupled to the multi-wavelength laser module and configured to receive the laser beams and combine the laser beams into a combined beam;
an optical channel having a beam splitter and m light modulators, wherein m is an integer smaller than n, configured to receive the combined beam; and
a light signal generating element, receiving the combined beam through the optical channel and modulating the combined beam to emit a plurality of light output signals,
wherein the beam splitter receives the combined beam through the optical channel, splits the combined beam into a plurality of first beams, and respectively transmits the plurality of first beams to a demultiplexer in the m light modulators, each of the plurality of first beams comprises n laser beams with different peak wavelengths, and the m light modulators respectively modulating the plurality of first beams to respectively emit the plurality of light output signals.

2. The silicon photonic integrated system in the switch according to claim 1, wherein the number of the plurality of light output signals corresponds to the number of the m light modulators.

3. The silicon photonic integrated system in the switch according to claim 1, wherein each of the m light modulators further comprises a plurality of light modulating elements, and a second multiplexer,
wherein the demultiplexer is optically coupled to the beam splitter and the plurality of light modulating elements, respectively, and configured to receive a corresponding first beam of the plurality of first beams, split the corresponding first beam into a plurality of second beams, and respectively transmit the plurality of second beams to the plurality of light modulating elements,
the plurality of light modulating elements modulate corresponding second beams of the plurality of second beams, generating a corresponding first-order light signal, and transmitting the first-order light signals to the second multiplexer,
the second multiplexer receiving and combining the first-order light signals from the plurality of light modulating elements to output a corresponding one of the plurality of light output signals.

4. The silicon photonic integrated system in the switch according to claim 3, wherein the number of the plurality of light modulating elements corresponds to n.

5. The silicon photonic integrated system in the switch according to claim 1, further comprising a controller configured to drive the m light modulating elements in the plurality of light modulators.

6. The silicon photonic integrated system in the switch according to claim 1, wherein the m light modulators are respectively integrated into different package modules.

7. The silicon photonic integrated system in the switch according to claim 6, wherein the first multiplexer, the optical channel, and the beam splitter are integrated into a package module.

8. The silicon photonic integrated system in the switch according to claim 1, wherein the first multiplexer, the optical channel, and the light signal generating element are integrated into a package module.

9. The silicon photonic integrated system in the switch according to claim 1, wherein the multi-wavelength laser module, the first multiplexer, the optical channel, and the light signal generating element are integrated into a package module.

10. The silicon photonic integrated system in the switch according to claim 1, wherein the multi-wavelength laser module comprises a plurality of laser beam emitting modules respectively emitting one of the n laser beams.

11. The silicon photonic integrated system in the switch according to claim 1, wherein the optical channel has a first end and a second end corresponding to each other, the first end is connected to the first multiplexer, and the second end is connected to the light signal generating element.

* * * * *